United States Patent

Kuppenheimer, Jr. et al.

Patent Number: 4,710,630
Date of Patent: Dec. 1, 1987

[54] OPTICAL DETECTION SYSTEM

[75] Inventors: John D. Kuppenheimer, Jr., Tewksbury, Mass.; Kirby A. Smith, Derry, N.H.

[73] Assignee: Sanders Associates, Inc., Nashua, N.H.

[21] Appl. No.: 763,158

[22] Filed: Aug. 7, 1985

[51] Int. Cl.⁴ .............................................. G01J 3/36
[52] U.S. Cl. .................................... 250/353; 250/216; 250/349; 250/339
[58] Field of Search ............... 250/353, 349, 216, 339; 350/630; 126/440, 441

[56] References Cited

U.S. PATENT DOCUMENTS

| | | | |
|---|---|---|---|
| 3,699,339 | 10/1972 | Taczak, Jr. | 250/353 |
| 3,869,199 | 3/1975 | Cummings | 126/440 |
| 3,899,672 | 8/1975 | Levi-Setti | 350/630 |

*Primary Examiner*—Carolyn E. Fields
*Attorney, Agent, or Firm*—Richard I. Seligman

[57] ABSTRACT

An optical system to permit two detectors to see the same field of view includes an angle converting cone, for mixing radiation from a field of view so that it can be applied to two detectors, and a lens for focusing the radiation onto the cone.

8 Claims, 1 Drawing Figure

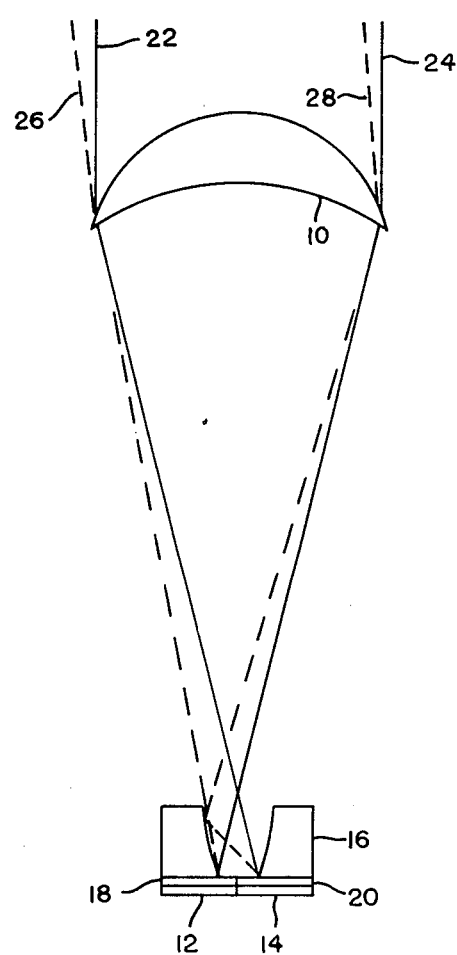

OPTICAL DETECTION SYSTEM

This invention relates to optical detection systems and, more particularly, to an optical detection system in which the field of view of the system is applied to two detectors.

There are various applications in which an optical system is required to stare into a field of view and where the field of view is applied to separate detectors. In certain applications, this is done in order to be able to detect the radiation from the field of view in two distinct bandwidths. The obvious way of accomplishing this is to apply the radiation from the field of view to a beam splitter with the output therefrom being applied to both detectors whereby each detector will see the same field of view. With certain applications, however, this is unacceptable because such apparatus is relatively expensive and consumes a relatively large amount of space.. Another way of accomplishing this is to use a field lens and stop but this is also relatively expensive, particularly in the infrared region of the spectrum where often such systems are required.

Cube splitters, sandwiched detectors and interdigitated detectors can also be used. However, as mentioned above, splitters are relatively expensive. They also have difficulties with large angles of incidence provided by fast lenses. Sandwiched detectors provide poor collection for the detector underneath while interdigitation of small detectors provides major challenges in fabrication.

One way of accomplishing this is to use an angle converting cone wherein the field of view is applied to the large mouth of the cone and two detectors are arranged at the small mouth of the cone to receive the radiation. Angle converting cones have the characteristic of scrambling the radiation applied thereto such that the radiation exiting the cone is homogenized and, therefore, the radiation from the field of view can be applied to both of the detectors. However, such a cone would have to be relatively long and for particular applications would not suffice.

Accordingly, it is an object of this invention to provide an improved optical detection system.

It is another object of this invention to provide an optical detection system for applying the same field of view to two detectors.

It is a further object of this invention to provide an optical system of the above type which is both inexpensive to fabricate and of small size.

SUMMARY OF THE INVENTION

Briefly, an optical detection system which applies a field of view onto two detectors is achieved by using an optical converting cone having the two detectors at the small mouth thereof and a lens which looks at the field of view and images the received radiation in a plane containing the large mouth of the angle converting cone.

BRIEF DESCRIPTION OF THE DRAWING

The above-mentioned and other features and objects of this invention will become more apparent by reference to the following description taken in conjunction with the accompanying drawing which is a cross-sectional view of an optical detection system according to the invention.

DESCRIPTION OF A PREFERRED EMBODIMENT

Referring to the drawing, there is illustrated thereby a preferred embodiment of the invention which includes a lens 10 which is employed to stare into a field of view and apply the radiation from the entire field of view onto two detectors 12 and 14. The detectors 12 and 14 are situated at the narrow mouth opening of an angle converting cone 16. Generally, a pair of filters 18 and 20 are disposed intermediate the angle converting cone 16 and the detectors 12 and 14 so that each of the detectors will detect radiation of a different spectral band. The angle converting cone 16 is situated with respect to the lens 10 so that the refracted rays from lens 10 will focus in a plane containing the large mouth of the angle converting cone 16.

Rays entering the lens 10 from the field of view into which it is staring will be equally applied to detectors 12 and 14 as shown by the on axis rays 22 and 24 which are rays are from the same point in space. These rays are received by the lens 10 refracted to a point and then applied into the cone to hit both detectors 12 and 14. Off-axis rays 26 and 28 which arrive from the same point in the field of view are applied through the lens 10 to hit the sides of the angle converting cone and be refelected so that equal amounts of energy from this point in the field of view will be applied equally to the detectors 12 and 14.

The radius of curvature of lens 10 is selected to minimize the blur circle so as to minimize the amount of rays which would not be collected by the angle converting cone 16. In one particular application, the radiation to be detected was in the infrared portion of the spectrum and lens 10 was made of silicon. However, as is well known, germanium and other materials may be used instead. The angle converting cone 16 is preferably made out of plastic substrate with the interior thereof made hollow and shaped in the proper configuration. The interior would also be preferably gold-plated to maximize transfer through reflection.

In the preferred embodiment, the upper portion of the angle converting cone is a compound parabolic concentrator while the lower portion is a straight wall cone. The point where the curvature of the angle converting cone goes from a compound parabolic concentrator to a straight wall cone is the point where the marginal off axis ray (the ray from the lens which comes from the edge of the field of view and passes through the edge of the lens) strikes the collector wall and is reflected to the edge of the detector at the maximum acceptable impingement angle at the detector.

Detectors 12 and 14 can be comprised of a single detector substrate but divided in half by a contact in the center and appropriate filters 18 and 20. On the other hand, detectors 12 and 14 can be separate detectors and can in fact be made of separate materials such as lead selenide and lead sulfide.

This system in addition to being inexpensive and small also has good signal to noise ratio. Because of the etendue conserving nature of the angle converting cone, the detector area can be smaller than the collection area thereby providing a gain in signal to noise ratio while, at the same time, providing field homogenization between the two detectors.

The thickness of the lens at the center is chosen to provide sufficient stiffness to undergo the physical environment in which the system will be used. If more mass can be tolerated, a thicker lens can only enhance optical performance. The cone design is used to regain signal to noise ratio lost by using two detectors instead of one, to control the impingement angle at the multilayer filter surface and to mix the radiation so that both detectors can see the same field of view.

While we have dscribed above the principles of our invention in connection with specific apparatus, it is to be clearly understood that this description is made only by way of example and not as a limitation of the scope of our invention as set forth in the accompanying claims.

We claim:

1. An optical system for applying radiation from the same field of view onto separate portions of a detector, comprising:

an angle converting cone having an input opening and a smaller output opening;

means for imaging radiation from a predetermined field of view at a point in a plane at the input opening of said angle converting cone; and detection means disposed at the output opening of said angle converting cone.

2. The optical system of claim 1, wherein said imaging means includes a lens.

3. The optical system of claim 2, wherein the radiation to be detected is in the infrared portion of the spectrum and said lens is made of a material selected from the group consisting of silicon and germanium.

4. The optical system of claim 1, wherein said angle converting cone has an upper section configured as a compound parabolic concentrator and a lower section as a straight walled cone.

5. The optical system of claim 1, wherein said detection means includes a first detection portion and a second detection portion responsive to radiation of different spectral bands, each portion of which detects radiation from the same field of view.

6. The optical system of claim 5, further including filter means disposed intermediate said angle converting cone and said detection portions.

7. The optical system of claim 1, wherein said detection means includes a first detector and a second detector responsive to radiation of different bands, each detector detecting radiation from the same field of view.

8. The optical system of claim 7, further including filter means disposed intermediate said angle converting cone and said first and second detectors.

* * * * *